United States Patent [19]

Schiemann

[11] Patent Number: 5,000,904
[45] Date of Patent: Mar. 19, 1991

[54] DEVICE AND PROCESS FOR PRODUCTION OF BLOWN THREE-HANDLED CONTAINER

[76] Inventor: Wolfram Schiemann, Eugen Nagele Strasse 17, 7140 Ludwigsburg, Fed. Rep. of Germany

[21] Appl. No.: 417,578

[22] Filed: Oct. 5, 1989

Related U.S. Application Data

[62] Division of Ser. No. 276,773, Nov. 28, 1988, Pat. No. 4,903,854.

[51] Int. Cl.[5] .................. B29C 49/04; B29C 49/20
[52] U.S. Cl. .................................. 264/515; 264/516; 425/112; 425/123; 425/503; 425/525
[58] Field of Search .......... 264/515, 516, 513; 425/503, 326.1, 112, 123, 525

[56] References Cited

U.S. PATENT DOCUMENTS 3,724,981  4/1973  Schiemann ............... 425/541 X
3,744,650  7/1973  Schiemann ............... 264/540 X
3,898,310  8/1975  Schiemann ............... 264/516 X Primary Examiner—Jan H. Silbaugh
Assistant Examiner—Catherine Timm

[57] ABSTRACT

A device for producing a plastic blown three-handled container uses a blow mold comprising two mold halves which can be moved towards one another. In the lower region of each mold half a partial handle shell with a wall region is inserted and a groove is provided for the external handles of the three-handled container. The device has a sliding bar for each mold half, the face of which forms at least one part of the blow mold wall when slid into position. The wall region of each partial handle shell extends to the center line of the container. Each partial handle shell has a half of a central handle, which is formed as a half channel, the edges of which extend to the center line of the container. Each sliding bar has a recess for one half of a central handle, and the face of each sliding bar forms the mold wall in the space between the mold halves.

2 Claims, 3 Drawing Sheets

DEVICE AND PROCESS FOR PRODUCTION OF BLOWN THREE-HANDLED CONTAINER

This is an Divisional of copending patent application Ser. No. 276,773, now U.S. Pat. No. 4,903,854 filed Nov. 28, 1988 of the same inventor.

The invention relates to a device for production and a process for production of a three-handled plastic container.

BACKGROUND OF THE INVENTION AND RELEVANT ART

Such containers have a head portion, an outer wall and two injection-molded partial shells. Each of the shells has an external handle with handle roots, a recessed grip located between the handle roots and a wall region having an outer surface which follows the contour of the three-handled container in the regions of the handle roots, the outer wall, the recessed grip, and the head portion. Both partial shells are of a form that is essentially symmetrical to the central parting line of the container and are arranged essentially symmetrically to the central parting line, and blown plastic extends between the partial shells.

A container as described is disclosed in the German Patent No. 21 51 913. A device for its manufacture is disclosed in the German Patent Specification No. 19 27 014. A three-handled container naturally has three handles so that when they are empty two external handles of neighboring containers can be grasped with one hand and thus four container can be carried in all. If the container is full, it is carried by the central handle.

The weights of containers of this type including contents may be considerable. The standard three-handled container holds 20 liters. There are, however, also 30-liter containers. The external handles of conventional containers comprise injection molded material. It is known that injection-molded components, although having the same base material, are essentially more rigid than blown components and are also much smoother, this being due to a difference in the pressure of production greater than a factor of 100. They are thus of high quality where stress characteristics and carrying characteristics are concerned. The central handle, however, has an essentially rougher surface. If may be that this is of little importance if a container is carried occasionally. If, however, many containers must be carried, as is necessary for example when supplying the population during disasters or when for example the tanks of an aircraft which contain many cubic meters have to be filled from containers, the difference between a small and a high degree of surface roughness is very quickly noticeable and it is also very quickly noticed whether flashes are present or not.

As the central handle is made from the same parison material which the extruder extrudes, only the duubled material thickness of this parison is available as a volume for producing the central handle. This means that the central handle remains realtively narrow, so that it cuts into the hand during carrying. Thus success has not yet been had in the case of plastic containers, with what has been known since the 1940's with metallic three-handled container: namely, making the central handle wider and easy to carry and particularly with a low degree of surface roughness and without substantial flashes.

In the case of plastic containers, the central handle had also to be kept substantially shorter since it is made from less rigid material. Thus no success has been had with making this handle as long as has been the case with metal containers for a long time.

Moreover, the central handle is situated at a lower level than the two external handles. This is done because it is not particularly capable of withstanding stresses for example if dropped or stacked. This means that it is difficult for a large human fist to fit into the space between the central handle and the adjacent upper side of the container, and impossible when a glove is worn. The central handle must also be located lower down for a reason—which is not apparent from the publications—which is because the two handle roots must be pinched. The tool for pinching, however, requires space.

As is also show in the Figure of German Patent Specification No. 19 27 014, a multicomponent tool is necessary because of the numerous undercuts. This requires expenditure on the production machine, on synchronization, and so on.

OBJECT AND STATEMENT OF THE INVENTION

An object of the invention is to provide a device for producing the blown three-handled plastic container. Such a device uses a blow mold comprising two mold halves which can be moved towards one another. In the lower region of the mold halves a partial shell with a wall region may be inserted and a groove is provided for the external handles of the three-handled container. The device has for each mold half a sliding bar, the face of which forms at least one part of the blow mold wall when slid into position.

This object is achieved by the following features:
(a) the wall region of each partial shell extends to the center line of the container,
(b) each partial shell has a half of a central handle, which is formed as a half channel, the edges of which extend to the center line of the container,
(c) each sliding bar has a recess for one halft of a central handle, and
(d) the face of each sliding bar forms the mold wall in the space between the mold halves.

By means of these features, a simpler blow-molding tool is achieved despite receiving and supporting the now greater wall region including the half of a central handle.

Advantageously, each sliding bar has an external flank that runs tangentially to the exteranl handle and an internal flank that runs tangentially to the periphery of the half of a central handle up to the center line of the container. By these means, the external surface of the recessed grip can be fully supported.

A further object of the invention is to provide a process for producing the blown three-handled plastic container. Such object is achieved by the following method:
(a) inserting injection-molded partial shells into open halves of a blow mold, each partial shell having a wall region extending to the center line of the container and half of a central handle,
(b) inserting a sliding bar which closes a groove for external handles of the three-handled container and supports half of the central handle from underneath,
(c) extruding a hot plastic parison into the blow mold,
(d) closing the blow mold, and (e) inflating the parison, (f) wherein, the parison material welds the faces of the wall regions and the halves of a central handle of each partial shell.

By means of these steps not only a possitive but also a practical bonding involving similar materials is achieved between the injection-molded partial shells and the blow-molded container body. Moreover, a minimum of process steps is thereby involved, not only from the aspect of the operator but also from the machinery aspect.

DESCRIPTION OF THE DRAWINGS

The invention is now described by means of a preferred exemplary embodiment. In the drawings.

DESCRIPTION OF A PREFERRED EMBODIMENT

Figure 1:
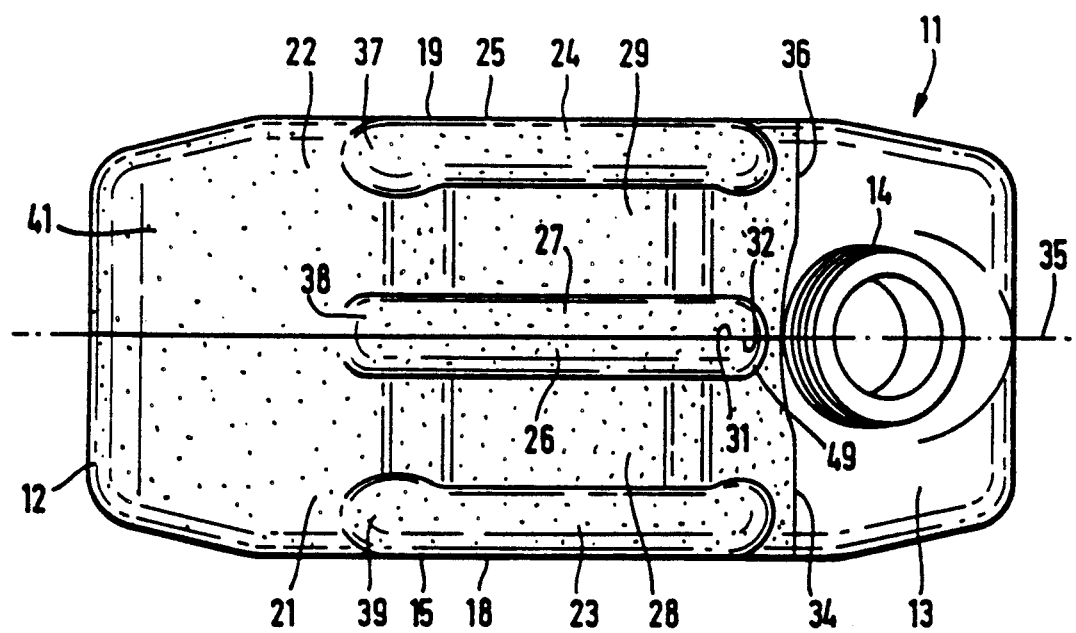
FIG. 1 shows the plan view of a 20-liter three-handled container.
Figure 2:
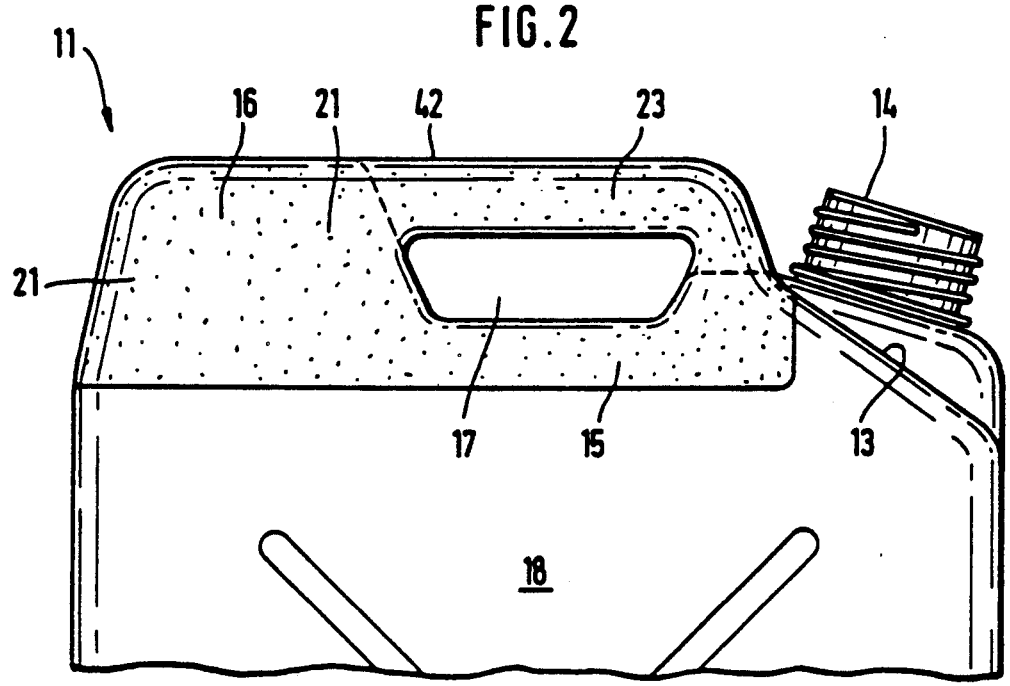
FIG. 2 the side view to FIG. 1.
Figure 3:
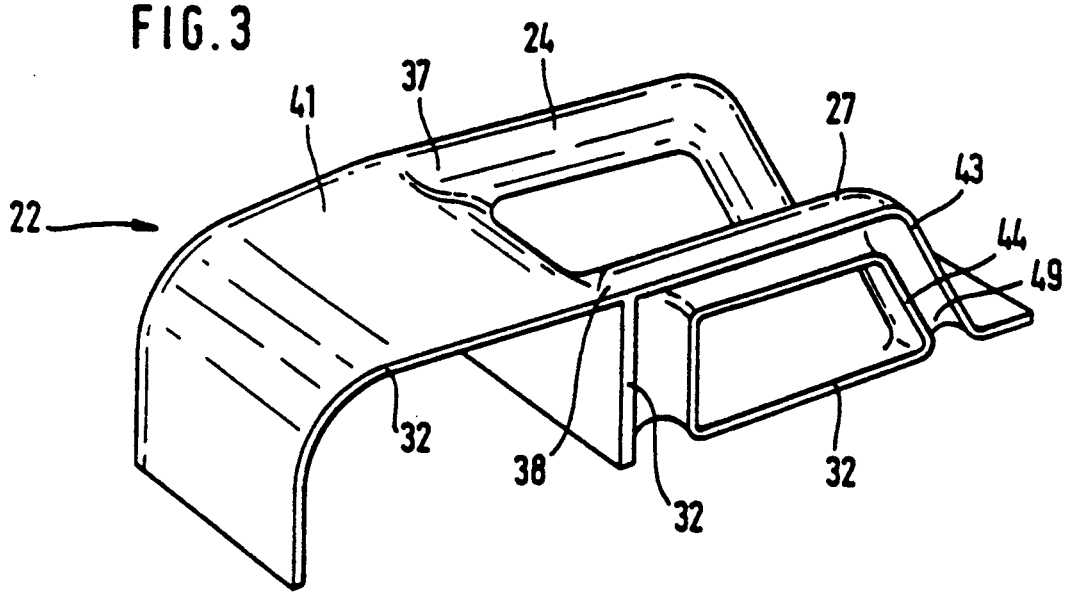
FIG. 3 a perspective view of an injection-molded partial shell.
Figure 4:
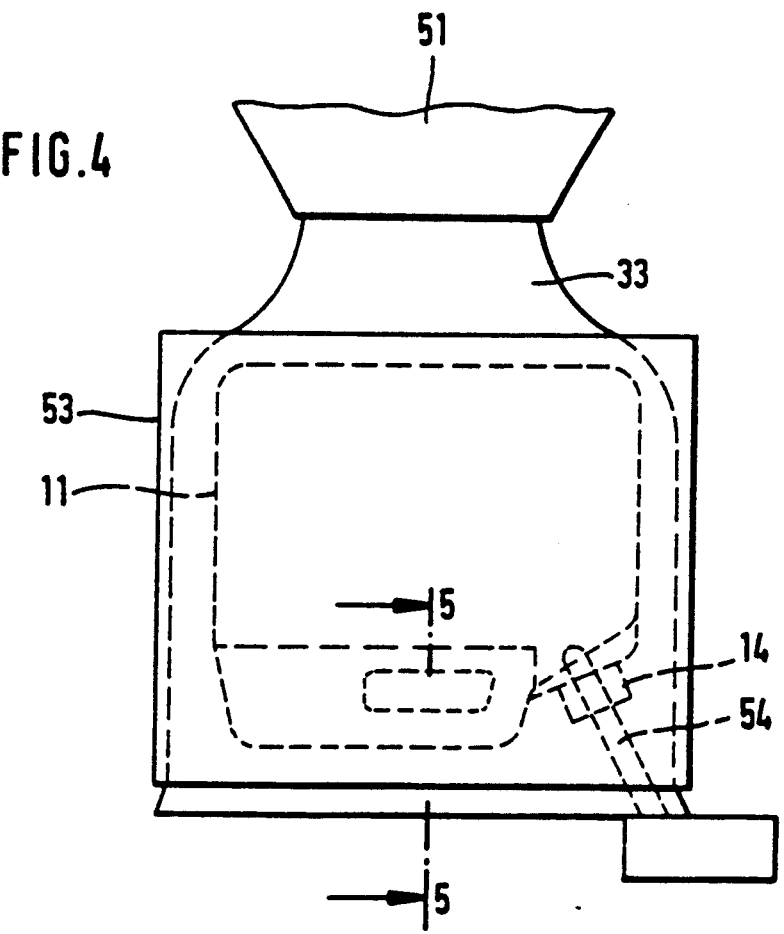
FIG. 4 the schematic side view of extruder, blow mold and mandrel.

A three-handled container 11 has a body 12, which container about 20-liters liquid. A dischared nozzle 14 projects from a level 13 sloping off to the right hand side. The three-handled container 11 has a head 16, a recessed grip 17 and the two larger external walls 18 and 19. Partial shells 21 and 22, shown as dotted lines, are provided as described in FIG. 1 and FIG. 2. Each partial shell is injection-molded and has an external handle 23, 24 as well as a half of a central handle 26, 27. Each partial shell 21, 22 comprises a wall region 28, 29 one face of which 31, 32 extends to the geometrical center line 35, which is also at the same time the parting line. The faces 31, 32 are delicately bonded together by hot parison material (FIG. 4). The leading edge 34, 36 of wall region 28, 29 extends to the vicinity of the discharge nozzle 14. The wall region projects in each case with a shroud 15, 25 into the external walls 18, 19 following the surface contours of the latter. It also extends lengthwise from the left hand roots 37, 38, 39 as the cap 41 over the hand 16 of the three-handle container 11. It is shown in particular on the perspective representation given in FIG. 3, which shows the partial shell 22. As shown in the side view in FIG. 2, there is a generally flat upper side 42, which comprises the roof of the cap 41 and the upper side of the external handles 23, 24 and the halves of a central handle 26, 27. The halves of a central handle 26, 27 have also non-overlapping faces 43 (outer) and 44 (inner), which are situated in the center line 35 and are delicately bonded together not only by the hot parison material 33 but by the pressure of the tool. The halves of a central handle 26, 27 have the shape of a continuous half channel 46, 47, which combines to form central handle. In this hollow space formed by the half channels 46, 47, starting at the handle root 38, there is extruded parison material 48, which fills the half channels 46, 47 and is also connected in turn at the root of the central handle 49 with the internal, in normal use, upper top wall 50 of the body 12, so that as it were a lug of parison material 48 extends through the halves of a central handle 26, 27. The volume enclosed within the half channels 46, 47 of the halves of a central handle 26, 27 is dimensioned in such a way that it is in any event filled with parison material 48.

In production, an extruder 51 extrudes the parison material 33 as described in FIG. 4. The parting line 35 (center line) lies parallel to the plane of the drawing in FIG. 4. To the right and left of this, halves of a blow mold 52, 53 are provided, between which the parison 33 can be admitted. Moreover, a mandrel 54 is provided. The halves of the blow mold 52, 53 each have a channel 55 for receiving the external handles 23, 24. Further, the half of the blow mold 52, 53 partly accepts the partial shells 21, 22 as described in FIG. 5. Insofar as the partial shells 21, 22 extend over the endges 56, 57 of the havles of the blow mold 52, 53 towards the parting line 35, these are maintained in the closed condition, supported against the internally acting blow pressure by means of the faces 60, 65 of each half of a sliding bar 58, 59. In this manner, the faces 60, 65 are continuations of the inner surface of the halves of the blow mold 52, 53 in this region. Each half of the sliding bar 58, 59 has a complementary recess 61, 62 in the region of the halves of a central handle 26, 27. The lower region of the recess 61 supports the halves of a central handle 26, 27 respectively running outwards to the left from 6 o'clock to about 10 o'clock and to the right to about 2 o'clock. Above, there is an adjacent bevel 63, 64 which lies at such an angle that the bevels 63, 64 intersect not only in the faces 60, 65 but also the parting line 35 and moreover form a tangent to the periphery in each case of the halves of a central handle 26, 27. The external bevels 66, 67 run parallel to this. If the direction of displacement of the halves of a sliding bar 58, 59 corresponds to the arrows 68, 69 which also run parallel to the bevels 63, 64, 66, 67, the outer handles 23, 24 and at the same time also the halves of a central handle 26, 27 are avoided, the inner region of the wall regions 28, 29 is supported all over and the parison material 73 can be nipped with the corners 71, 72.

Figure 5:
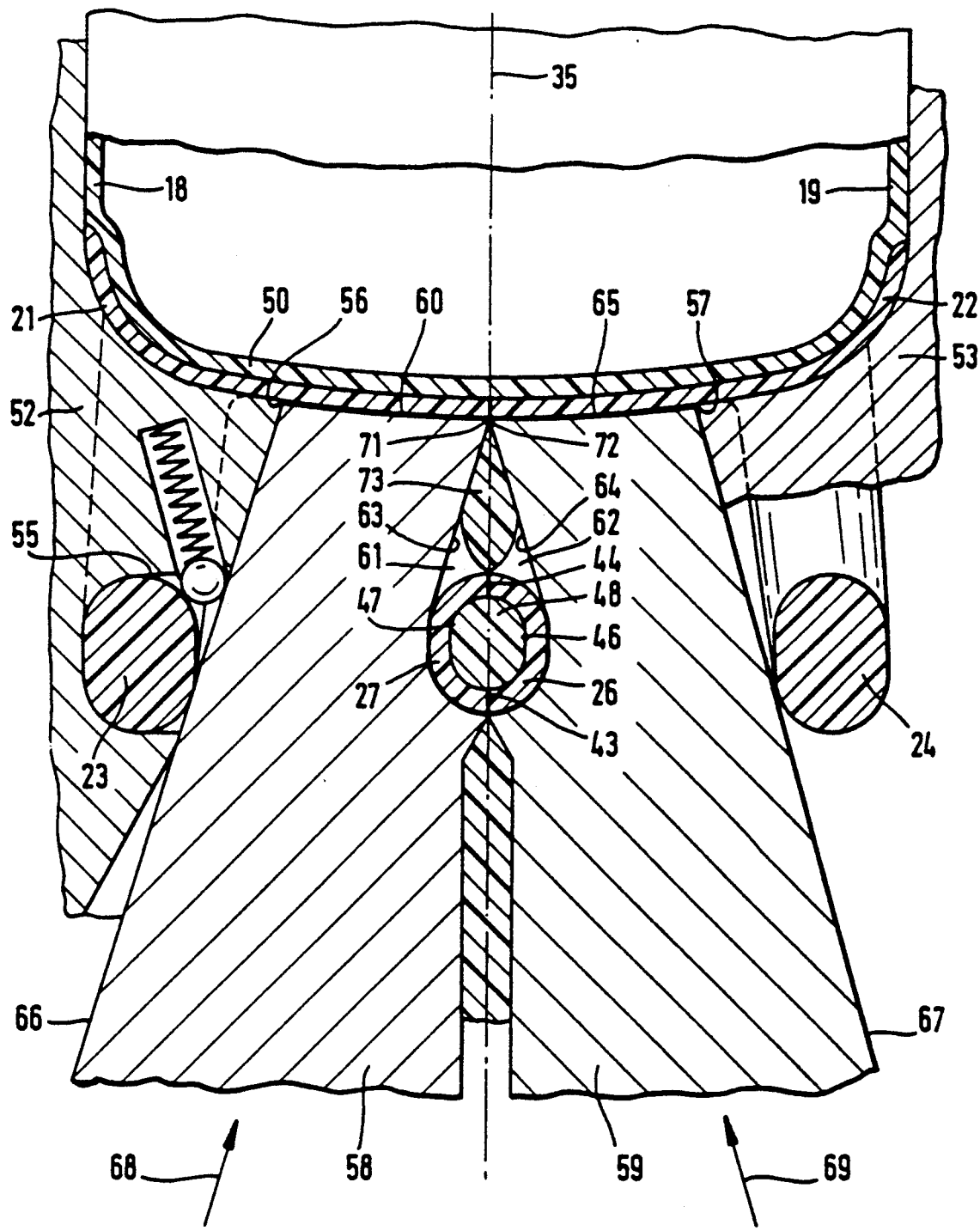
FIG. 5 a section along the line 5—5 in more exact representation.

As may be seen from FIG. 5, doubled wall thicknesses are now present, namely the upper wall 50 together with the wall regions 28, 29. The thin places which are sometimes located in the region of the corners of the head due to the high draw ratio are now reliably double layered.

In operation, a partial shell 21, 22 is in each case inserted into the lower region of the halves of the blow mold 52, 53 while the halves of a sliding bar 58, 59 are not yet slid in, the unspecified sprung ball bearing devices being able to assist in initially holding the partial shells 21, 22. Then the halves of a sliding bar 58, 59 are slid in via actuating devices which are not shown. The halves of the blow mold 52, 53 are now still far apart. It is then ensured that the parison material 33 is running downwards. The halves of the blow mold 52, 53 are now shut and the mandrel 54 is placed in the blowing position and inflates the volume within the parison material which has now been nipped. After cooling the halves of the sliding bar 58, 59 are withdrawn against the arrows 68, 69 and then the halves of the blow mold 52, 53 are opened.

What is claimed is:

1. Apparatus for producing a blown three-handled container made of plastic comprising a blow mold having two mold halves which can be moved towards one another, each mold half having a lower region in which a partial shell with a wall section and an exterior handle is to be inserted each mold half further having a groove for receiving said external handle, said apparatus further comprising a sliding bar for each mold half, said sliding bar having a face that forms at least a part of a blow mold wall and at least partly supports said wall region of said partial shell when slid into position, wherein:

(a) a wall region of each partial shell extends to a center line of said mold, (b) each partial shell further has a half of a central handle, which is formed as a half channel with edges that extend to said center line of said mold, (c) each sliding bar is a single part and has a recess that contacts and supports respective halves of said central handle on said partial shells, which recess includes an internal straight flank that runs tangentially to a periphery of said half of said central handle up to said center line of said mold, (d) each sliding bar has an external straight flank that runs tangentially to respective external handles on said partial shells and along said mold half up to said blow mold wall, and (e) each sliding bar is slidably mounted for movement in one straight direction, which direction is parallel with both said internal and external straight flanks of said sliding bar.

2. A process for producing a blown three-handled container made of plastic, comprising:

(a) inserting injection molded partial shells into open halves of a blow mold, each partial shell having a wall region extending to a center line of said container, half of a central handle and an external handle, (b) then inserting a sliding bar for each of said mold halves, whereby
said sliding bar is a single part and a face of said sliding bar at least partly supports said wall region of respective partial shells,
a recess on said sliding bar contacts and supports a respective half of said central handle, and
an external flank of said sliding bar contacts and supports a respective external handle, (c) extruding a hot plastic parison into said blow mold, (d) closing said blow mold whereby said halves of said central handles combine to form the central handle and said central handle is filled with parison material and wherein, parison material welds faces of said wall regions and said halves of said central handle of each partial shell together, and (e) inflating said parison in said blow mold to form said three-handled container.

* * * * *